(12) United States Patent
Matsunami et al.

(10) Patent No.: US 10,962,430 B2
(45) Date of Patent: Mar. 30, 2021

(54) PRESSURE SENSOR

(71) Applicant: FUJI ELECTRIC CO., LTD., Kanagawa (JP)

(72) Inventors: Kazuhiro Matsunami, Matsumoto (JP); Mutsuo Nishikawa, Matsumoto (JP); Yuko Fujimoto, Shiojiri (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 254 days.

(21) Appl. No.: 16/174,247

(22) Filed: Oct. 29, 2018

(65) Prior Publication Data

US 2019/0187016 A1 Jun. 20, 2019

(30) Foreign Application Priority Data

Dec. 18, 2017 (JP) ............................. JP2017-242243

(51) Int. Cl.
*G01L 9/00* (2006.01)
*G01L 9/08* (2006.01)

(52) U.S. Cl.
CPC .................................. *G01L 9/0051* (2013.01)

(58) Field of Classification Search
CPC ...... G01L 9/00–08; G01L 9/51; G01L 9/0051
See application file for complete search history.

(56) References Cited

U.S. PATENT DOCUMENTS

| | | | |
|---|---|---|---|
| 9,846,096 B2 * | 12/2017 | Chen | G01L 9/0054 |
| 2006/0214202 A1 * | 9/2006 | Zorich | G01L 9/0055 257/294 |
| 2006/0278012 A1 | 12/2006 | Fujimoto | |
| 2015/0001650 A1 | 1/2015 | Matsunami | |
| 2015/0008544 A1 * | 1/2015 | Yazawa | B81B 3/0086 257/417 |
| 2015/0135854 A1 * | 5/2015 | McNeal | G01L 9/06 73/861.351 |
| 2015/0260596 A1 * | 9/2015 | Lemke | G01L 9/065 73/727 |
| 2015/0285703 A1 | 10/2015 | Ishikawa | |

FOREIGN PATENT DOCUMENTS

| | | |
|---|---|---|
| JP | 2000221091 A | 8/2000 |
| JP | 2006329929 A | 12/2006 |
| JP | 2015010931 A | 1/2015 |
| WO | 2014061263 A1 | 4/2014 |

* cited by examiner

*Primary Examiner* — Nguyen Q. Ha

(57) ABSTRACT

A pressure sensor for detecting pressure is provided. A pressure sensor including: a sensor portion that is provided in a diaphragm in a substrate; a circuit portion that is provided on the substrate and electrically connected to the sensor portion; a pad of conductivity that is provided above the substrate; and a first protective film that is provided on the pad, wherein the first protective film is also provided above the circuit portion, is provided. The first protective film may cover the circuit portion entirely. The first protective film may not cover at least part of the sensor portion. The first protective film may cover part of the sensor portion.

12 Claims, 16 Drawing Sheets

PRESSURE SENSOR

The contents of the following Japanese patent application (s) are incorporated herein by reference:
NO. 2017-242243 filed in JP on Dec. 18, 2017.

BACKGROUND

1. Technical Field

The present invention relates to a pressure sensor.

2. Related Art

Conventionally, pressure sensors in which piezoresistive elements are protected with shielding films are known (Patent document 1). Also, pressure sensors including: a film that is a laminated film formed of a Cr film and a Pt film for ensuring the degree of adhesion and preventing the diffusion on pads that are formed of base material such as aluminum or aluminum alloy; and an Au film laminated on the film for ensuring the degree of adhesion and preventing the diffusion, are known (Patent document 2).
Patent document 1: Japanese Unexamined Patent Application, Publication No. 2000-221091
Patent document 2: Japanese Unexamined Patent Application, Publication No. 2015-10931
Preferably, reliability of pressure sensors is improved.

SUMMARY

The first aspect of the present invention provides a pressure sensor including: a sensor portion that is provided in a diaphragm in a substrate; a circuit portion that is provided on the substrate and electrically connected to the sensor portion; a pad of conductivity that is provided above the substrate; and a first protective film that is provided on the pad. The first protective film may also be provided above the circuit portion.

The first protective film may cover the circuit portion entirely.

The first protective film may not cover at least part of the sensor portion.

The first protective film may cover part of the sensor portion.

The first protective film may include at least one of gold and platinum.

The sensor portion may have a well region of first conductivity type, a diffusion region of second conductivity type that is provided in the well region, and an insulating region that is provided next to the diffusion region in the well region. The pressure sensor may further include a second protective film that is provided above the insulating region and has different material from that of the first protective film.

The pressure sensor may further include a passivation film that is provided above the sensor portion. The first protective film may be provided on the passivation film.

The second protective film may be provided below the passivation film.

The insulating region may have an element isolation film that is provided on the substrate. The second protective film may be provided on the element isolation film.

The circuit portion may have a MOS transistor. The second protective film may have the same material as that of gate polysilicon of the MOS transistor.

The end portion of the first protective film may be provided overlapping the second protective film above the substrate The first protective film and the second protective film may be provided overlapping each other above the end portion of the well region.

The second protective film may include polysilicon.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

In the present specification, one side in a direction parallel to a depth direction of a substrate is referred to as "above", the other side is referred to as "below". One of two principal surfaces of a substrate, a layer or some other member is referred to as an upper surface, and the other surface is referred to as a lower surface. The "above" and "below" directions are not limited by the direction of gravity or a direction of attachment to a substrate or the like at the time of implementation of a semiconductor device. In the present specification, technical matters are described in some cases using orthogonal coordinate axes of X-axis, Y-axis, and Z-axis. A depth direction of a substrate is regarded as Z-axis. Also, the orthogonal coordinate system is so-called right-handed system the present example.

Also, in the present specification and the attached figures, layers and regions labeled N or P indicate that electrons or holes are major careers therein, respectively. Also, (+) and (−) attached to N or P indicate that layers and regions with (+) and (−) have higher and lower impurity concentration than that of layers and regions without them. Note that, the present specification is described with first conductivity type as N-type and second conductivity type as P-type, but first conductivity type and second conductivity type may be interchanged with each other.

Figure 1A:
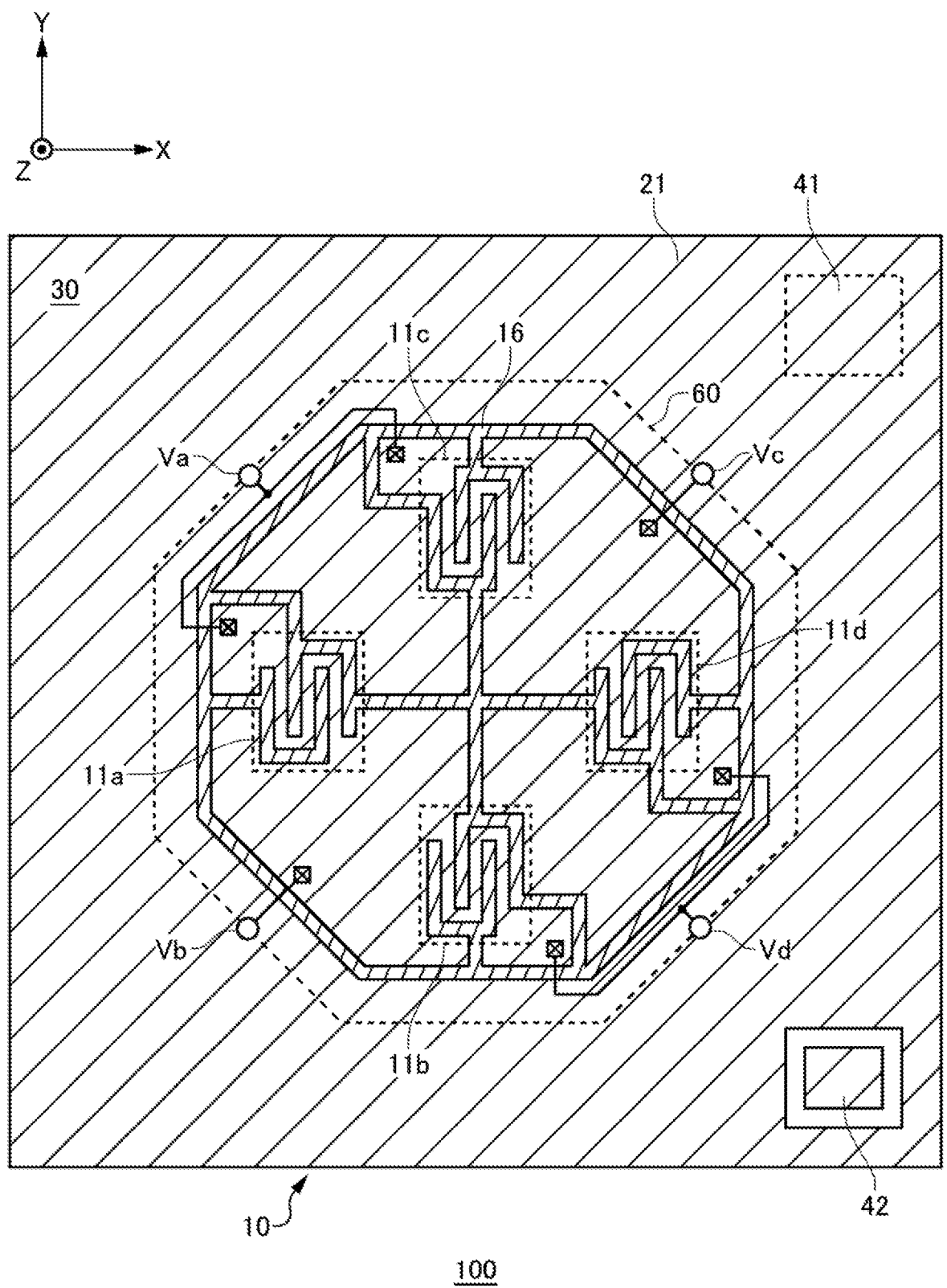
FIG. 1A is an exemplary top view of a pressure sensor 100 according to an example 1.

FIG. 1A is an exemplary top view of a pressure sensor 100 according to the example 1
The pressure sensor 100 includes a circuit portion 30 and a sensor portion 60. The pressure sensor 100 has, in an upper surface of a substrate 10, a first pad 41 and a second pad 42.

The substrate 10 is a semiconductor substrate of second conductivity type. As one example, the substrate 10 has a conductivity-type being P(−)-type. For example, the substrate 10 is a semiconductor substrate of Si, SiC, and the like.

The sensor portion 60 has a diaphragm in the substrate 10. In the diaphragm, a strain amount changes corresponding to pressure generated in the pressure sensor 100. In one example, a diaphragm is formed by etching the back surface of the substrate 10. The sensor portion 60 in the present example is, in the substrate 10, a region whose back surface is etched to form the diaphragm. The sensor portion 60 has a resistance portion 11 to detect change in the strain amount of the diaphragm. The sensor portion 60 in the present example is provided in the substrate 10, which integrate the sensor portion 60 and the circuit portion 30 into one-chip.

The resistance portion 11 includes four resistance portions 11a to 11d to configure a Wheatstone bridge. The resistance portions 11a to 11d in the present example are semiconductor strain gauges using piezoresistive elements whose resistance changes corresponding to the strain of the diaphragm. Thereby, the sensor portion 60 detects the pressure generated in the pressure sensor 100 as change in the resistances.

The insulating region 16 is an insulating region that is provided, in the sensor portion 60, on the upper surface of the substrate 10. In one example, the insulating region 16 is a region where an insulating film is provided on the upper surface of the substrate 10. For example, the insulating region 16 has a LOCOS (Local Oxidation of Silicon) film that is formed by oxidizing the substrate 10, or a polysilicon film. The insulating region 16 is provided in a comb shape on the upper surface of the substrate 10. Thereby, the serpentine pattern of the resistance portion 11 is formed.

Voltages Va to Vd change corresponding to change in resistances in the resistance portions 11a to 11d. The voltage Va is voltage of a terminal between the resistance portion 11a and the resistance portion 11c. The voltage Vb is voltage of a terminal between the resistance portion 11a and the resistance portion 11b. The voltage Vc is voltage of a terminal between the resistance portion 11c and the resistance portion 11d. The voltage Vd is voltage of a terminal between the resistance portion 11b and the resistance portion 11d.

The circuit portion 30 is provided surrounding the sensor portion 60. The circuit portion 30 is electrically connected to the sensor portion 60. The circuit portion 30 has a circuit such as an IC to perform processing on a signal detected by the sensor portion 60. The circuit portion 30 detects pressure generated in the pressure sensor 100 by performing processing on a signal output by the sensor portion 60. For example, strain generated in the diaphragm causes potential difference to be generated in output of the Wheatstone bridge. The circuit portion 30 converts the pressure generated in the pressure sensor 100 into an electrical signal by amplifying the potential difference of the voltages Va to Vd output from the Wheatstone bridge.

The first pad 41 and the second pad 42 are pads of conductivity that are provided above the substrate 10. Pads such as the first pad 41 and the second pad 42 are formed of base material such as aluminum or aluminum alloy that is provided on the substrate 10. Pads such as the first pad 41 and the second pad 42 may be formed of the same material as that of the wiring on the substrate 10. In one example, the first pad 41 and the second pad 42 are provided at openings formed by etching the insulating film above the circuit portion 30.

Above the substrate 10 of the pressure sensor 100 (on a passivation film 26 described below), a first protective film 21 is provided. In the present example, the first protective film 21 is provided above the circuit portion 30, the sensor portion 60, the first pad 41, and the second pad 42. Also, the first protective film 21 preferably covers the circuit portion 30 entirely. Covering the circuit portion 30 entirely means covering all the circuits that are provided in the circuit portion 30. Also, in the present example, the first protective film 21 covers the most of the sensor portion 60, but it may not cover part of the sensor portion 60.

The first protective film 21 on the second pad 42 and the first protective film 21 on the first pad 41 are separated, and the second pad 42 is a pad that is electrically separated from the first pad 41. That is, the first protective film 21 provided on the second pad 42 is electrically separated from the first protective film 21 provided on the circuit portion 30 excluding on the second pad 42. The second pad 42 may be electrically connected to outside of the pressure sensor 100 via wire bonding etc., or to a circuit provided in the circuit portion 30. The first pad 41 may be a ground terminal to set the first protective film 21 to the ground potential. Note that, in addition to the pads shown in the figure, pads equivalent to the first pad 41 or the second pad 42 may be provided.

Preferably, in addition to charging resistance, the first protective film 21 has corrosion resistance. In one example, the first protective film 21 includes acid-resistant material. The first protective film 21 in the present example includes at least one of gold and platinum. For example, the first protective film 21 is a Cr/Pt/Au film formed by laminating chromium (Cr), platinum (Pt), and gold (Au) in this order from the substrate 10 side. Also, the first protective film 21 is a Ti/Pt/Au film formed by laminating titanium (Ti), platinum (Pt), and gold (Au) in this order from the substrate 10 side.

Preferably, the pressure sensor 100 has charging resistance and corrosion resistance. Especially, it is preferable to improve corrosion resistance and charging resistance, without adding film forming processes dedicated to achieve charging resistance and corrosion resistance.

The corrosion resistance is resistance against corrosive substances that are adhered on the upper surface of the pressure sensor 100. The first protective film 21 protects, with its corrosion resistance, the upper surface of the pressure sensor 100 from corrosion. For example, in case of use under an exhausted gas environment etc., the pressure sensor 100 preferably has an acid-resistant protective film.

The charging resistance is resistance against electric charges that are adhered on the upper surface of the pressure sensor 100. If charged electric charges are accumulated on the upper surface of the pressure sensor 100, malfunction may occur in the pressure sensor 100. If electric charges are accumulated on the upper surface of the pressure sensor 100, the first protective film 21 functions as a shielding film to prevent malfunction of the pressure sensor 100 by charged electric charges.

The first protective film 21 provided above the circuit portion 30 is set to a predetermined reference potential. The first protective film 21 may be set to the same potential as the substrate 10 of the pressure sensor 100. For example, the first protective film 21 is set to the ground potential. Thereby, if charged electric charges are adhered on the upper surface of the pressure sensor 100, the first protective film 21 can shield electrical field generated by the electric charges.

The first protective film 21 in the present example is provided, in addition to above the circuit portion 30, also on the first pad 41. Thereby, the first protective film 21, while improving corrosion resistance, can improve charging resistance in the circuit portion 30. In this case, the pressure sensor 100 needs to provide no additional film forming process, by covering the circuit portion 30 with the same material as that of the protective film covering the upper surface of the first pad 41.

The first protective film 21 may be formed of different materials above the first pad 41 and the circuit portion 30, and the second pad 42. However, in case where, the first protective film 21 is formed of the same material above the first pad 41 and the circuit portion 30 and the second pad 42, the film forming process is decreased in the number of steps.

Figure 1B:
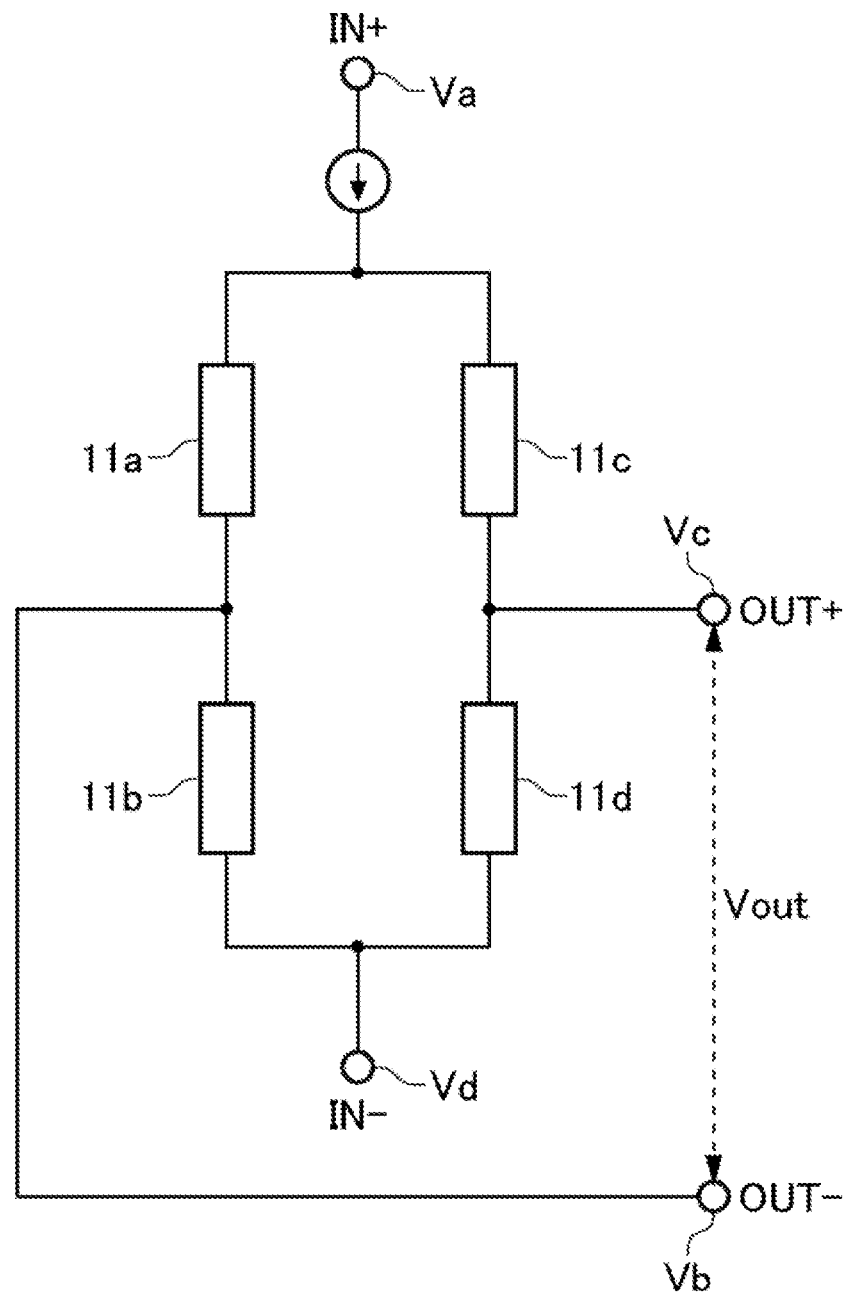
FIG. 1B shows an exemplary circuit configuration of the resistance portion 11 having the sensor portion 60.

FIG. 1B shows an exemplary circuit configuration of the resistance portion 11 included in the sensor portion 60. The voltage Va corresponds to the input voltage IN+. The voltage Vb corresponds to the output voltage OUT−. The voltage Vc corresponds to the output voltage OUT+. The voltage Vd corresponds to the input voltage IN−. The difference between the voltage Vc and the voltage Vb is output as output voltage Vout. In this manner, the pressure sensor 100 detects pressure applied to the pressure sensor 100 by reading out resistance values of the resistance portions 11a to 11d that change corresponding to the diaphragm from the voltages Va to Vd of the terminals.

Figure 2:
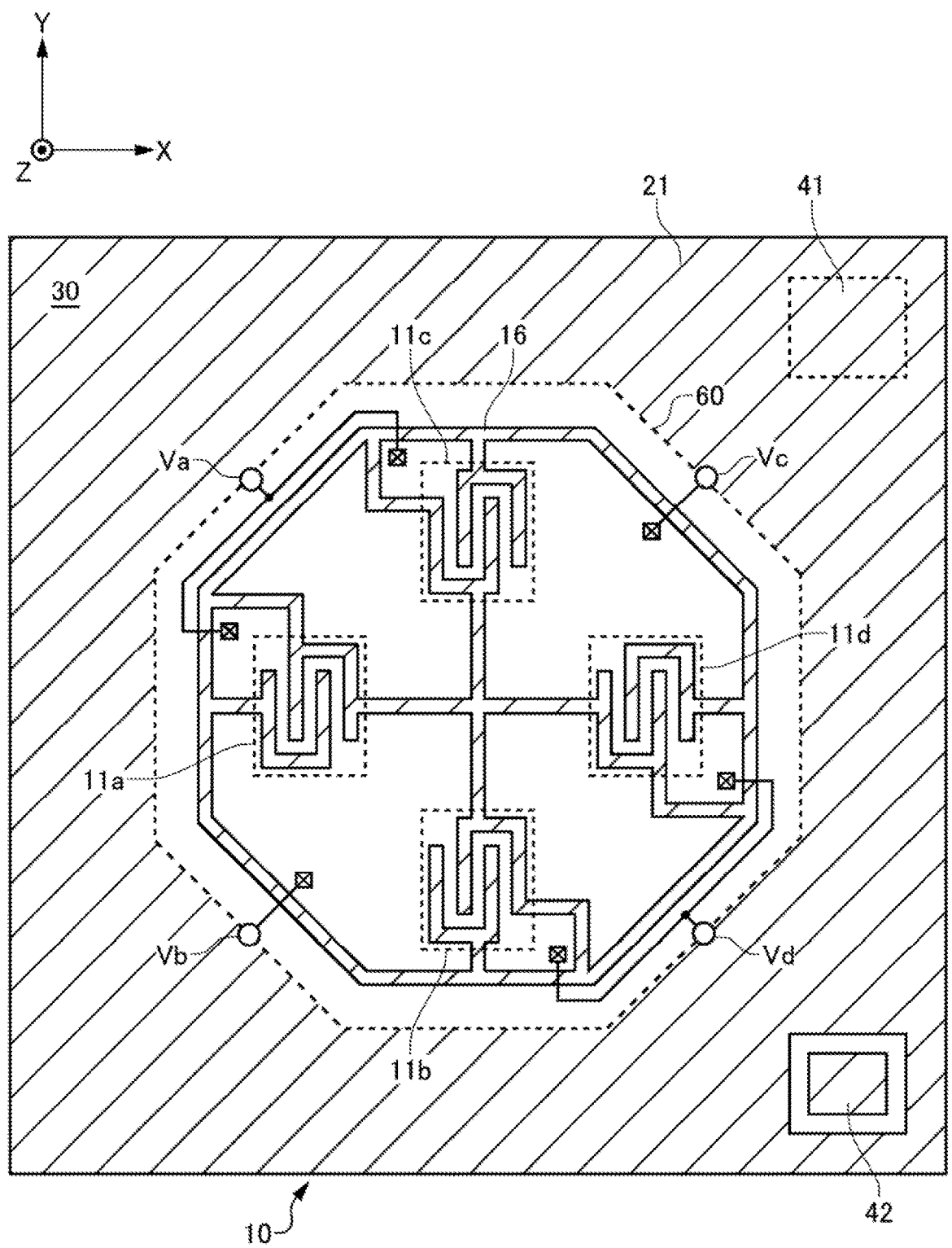
FIG. 2 shows an exemplary configuration of a pressure sensor 100 according to an example 2.

FIG. 2 shows an exemplary configuration of a pressure sensor 100 according to the example 2. In the present example, a position to which the first protective film 21 is provided is different from that of the pressure sensor 100 according to the example 1.

The first protective film 21 is provided above the circuit portion 30, the first pad 41, and the second pad 42. In the present example, the first protective film 21 does not cover the most of the sensor portion 60. Thereby, the first protective film 21 that is harder than the substrate 10 including gold or platinum generates film stress in the diaphragm, which can reduce effect on strain characteristics. Thus, as compared to a case where the first protective film 21 is provided on the surface entirely, the accuracy of the pressure sensor 100 can be improved.

However, the first protective film 21 may cover the insulating region 16 and the resistance portion 11. Thereby, like in the example 1, the first protective film 21 can protect areas that seriously affect the element performance, such as areas above the insulating region 16 and the resistance portion 11. That is, areas above the insulating region 16 or the resistance portion 11 can have charging resistance and corrosion resistance.

Note that, since the circuit portion 30 is not strained, film stress may not be considered regarding the first protective film 21 on the circuit portion 30.

Note that the first protective film 21 in the present example is formed of the same material, above the circuit portion 30, the first pad 41 and the second pad 42, the insulating region 16 and the resistance portion 11, respectively. However, the first protective film 21 may also be formed of different material either above the circuit portion 30, the first pad 41 and the second pad 42, or above the insulating region 16 and the resistance portion 11. However, from a point of view of manufacturing the pressure sensor 100, the first protective film 21 is preferably formed of the same material at the same time.

In the pressure sensor 100 in the present example, a region of the first protective film 21 provided in the sensor portion 60 is smaller than that of the pressure sensor 100 according to the example 1. Thus, the film stress of the first protective film 21 less affects characteristics of the pressure sensor 100.

Figure 3:
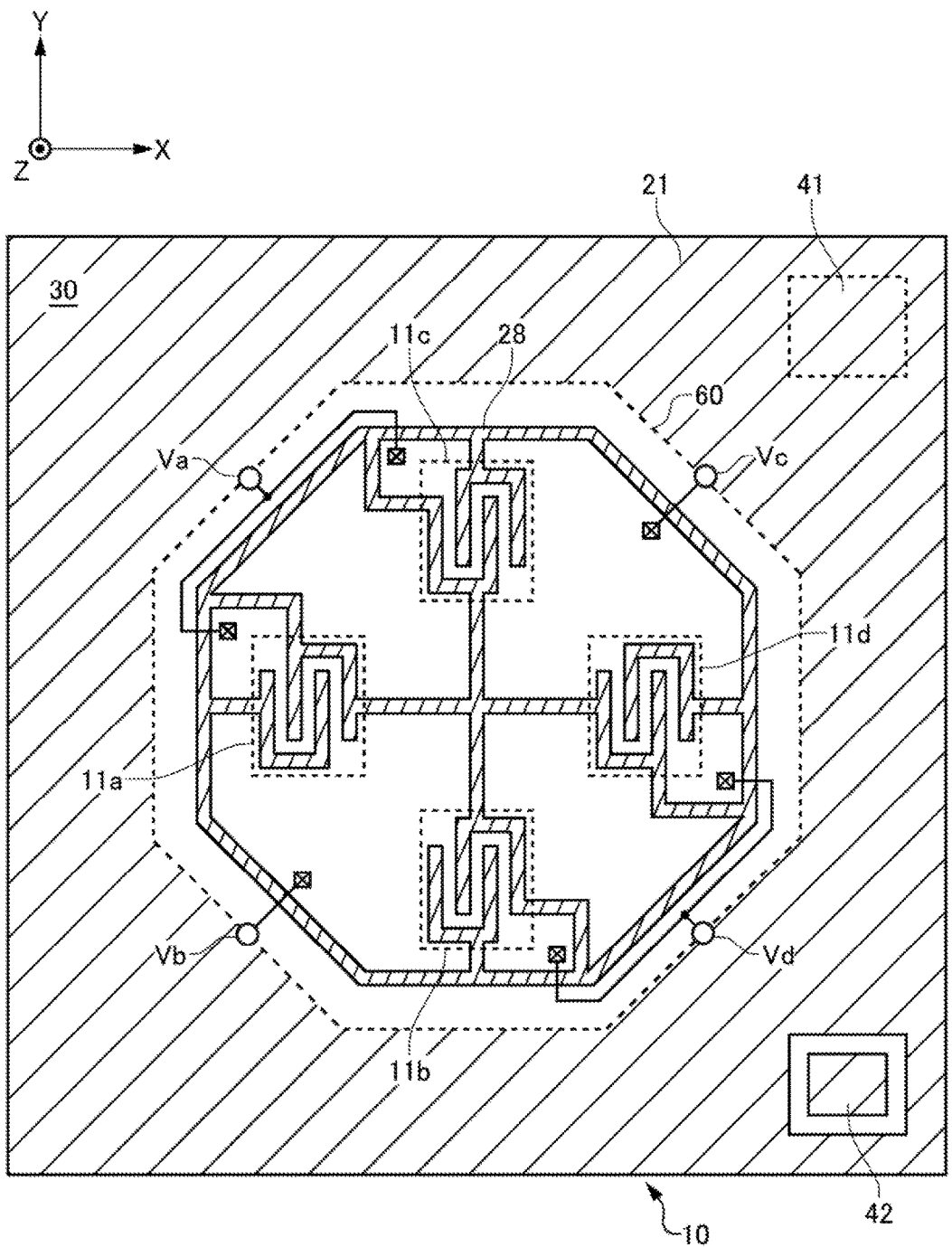
FIG. 3 shows an exemplary configuration according to a pressure sensor 100 of an example 3.

FIG. 3 shows an exemplary configuration of a pressure sensor 100 according to the example 3. In the present example, a position to provide the first protective film 21 is different from that of the pressure sensor 100 according to the examples 1 and 2. Also, the pressure sensor 100 in the present example further includes a second protective film 28.

The first protective film 21 is provided above the circuit portion 30, the first pad 41, and the second pad 42. The first protective film 21 in the present example is different from that of the example 1 in that it does not cover the most of the sensor portion 60 and is not provided above an area inside the sensor portion 60. Also, the first protective film 21 in the present example is the same as that of the example 2 in that it does not cover the most of the sensor portion 60, but different from that of the example 2 in that it is not provided above the insulating region 16 or the resistance portion 11. The first protective film 21 in the present example is not provided inside the sensor portion 60. Thus, as compared with a case where the first protective film 21 is provide on the surface entirely, the film stress of the first protective film 21 less affects the characteristics of the pressure sensor 100.

Note that the first protective film 21 in the present example is formed of the same material above the circuit portion 30, the first pad 41 and the second pad 42, respectively. However, the first protective film 21 may also be formed of different material any of above the circuit portion 30, the first pad 41 and the second pad 42. However, from a point of view of manufacturing the pressure sensor 100, the first protective film 21 is preferably formed of the same material at the same time.

The second protective film 28 is provided above the insulating region 16 and the resistance portion 11. The second protective film 28 has material different from the first protective film 21. Here, the film stress of the diaphragm directly affects the characteristics of the pressure sensor 100, and thus, for the diaphragm, material having closer stress to that of the substrate 10 is preferably used. In one example, the second protective film 28 is formed of material having more flexibility than that of the first protective film 21. Material having flexibility means material having little effect on the characteristics of the pressure sensor 100. That is, preferably, the material having flexibility means material not preventing strain of the diaphragm that is provided on the substrate 10.

For example, the second protective film 28 has material having similar flexibility to that of the substrate 10 by having the same material as that of the substrate 10. The pressure sensor 100 in the present example less affects the characteristics of the pressure sensor 100 by providing the second protective film 28 in the sensor portion 60, as compared with the case of providing the first protective film 21 in the sensor portion 60. Additionally, the film thickness of the second protective film 28 is preferably thinner than the film thickness of the first protective film 21. Note that the second protective film 28 may have the same material as that of a gate of a transistor (a gate 51 described below) provided in the circuit portion 30. For example, the material of the second protective film 28 includes polysilicon. The second protective film 28 is connected to a predetermined reference potential to improve charging resistance.

Note that the pressure sensor 100 in the present example has the second protective film 28 of polysilicon in the sensor portion 60, and provides the first protective film 21 including gold or platinum in the circuit portion 30. Here, shielding by providing polysilicon that is set to the reference potential in the circuit portion 30 can be considered. However, in the circuit portion 30, polysilicon is used for the gate of the MOS transistor, which requires an additional process to form polysilicon dedicated to the shielding film. On the other hand, the pressure sensor 100 in the present example does not provide the second protective film 28 in the circuit portion 30, which requires no additional film forming process of polysilicon dedicated to the shielding film. Furthermore, providing the first protective film 21 including gold or platinum in the circuit portion 30 can ensure corrosion resistance (e.g. acid resistance).

Note that the second protective film 28 may be not only provided above the insulating region 16 and the resistance portion 11, but also provided so as to cover the most of the sensor portion 60 (the diaphragm). However, the characteristics of the pressure sensor 100 is much less affected, in case where the second protective film 28 is provided above the insulating region 16 and the resistance portion 11.

Figure 4A:
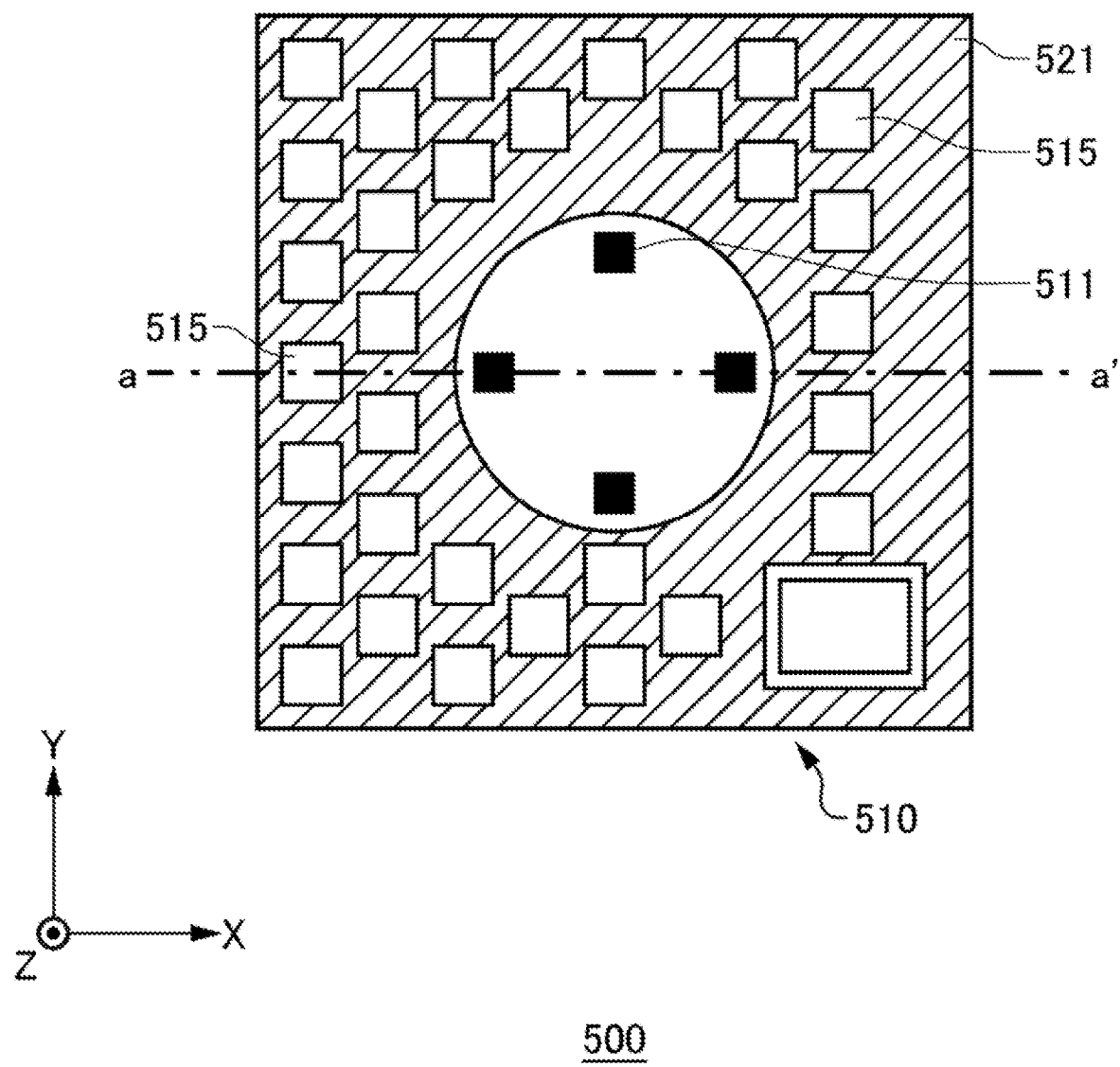
FIG. 4A is a top view of a pressure sensor 500 according to a comparative example 1.

FIG. 4A is a top view of a pressure sensor 500 according to the comparative example 1. The pressure sensor 500 according to the comparative example 1 has a resistance portion 511 on the substrate 510. The pressure sensor 500 according to the comparative example 1 is different from the examples, in that it does not have configurations equivalent to the first protective film 21. That is, in the pressure sensor 500 according to the comparative example 1, a protective film including gold or platinum is not provided on the pad. Similarly, a protective film including gold or platinum is not provided either on the circuit portion to perform processing on signals detected by the resistance portions 511. On the circuit portion, a protective film 521 is formed of the same material as that of the pad or the wiring, e.g. aluminum or aluminum alloy. The protective film 521 may be formed through the same process as a process dealing with aluminum such as the pad or the wiring. In the protective film 521 in the present example, a plurality of slits 515 are provided. Note that, over the sensor portion, especially, above the insulating region of the sensor portion or the resistance portion 511, the protective film 521 is not provided.

Figure 4B:
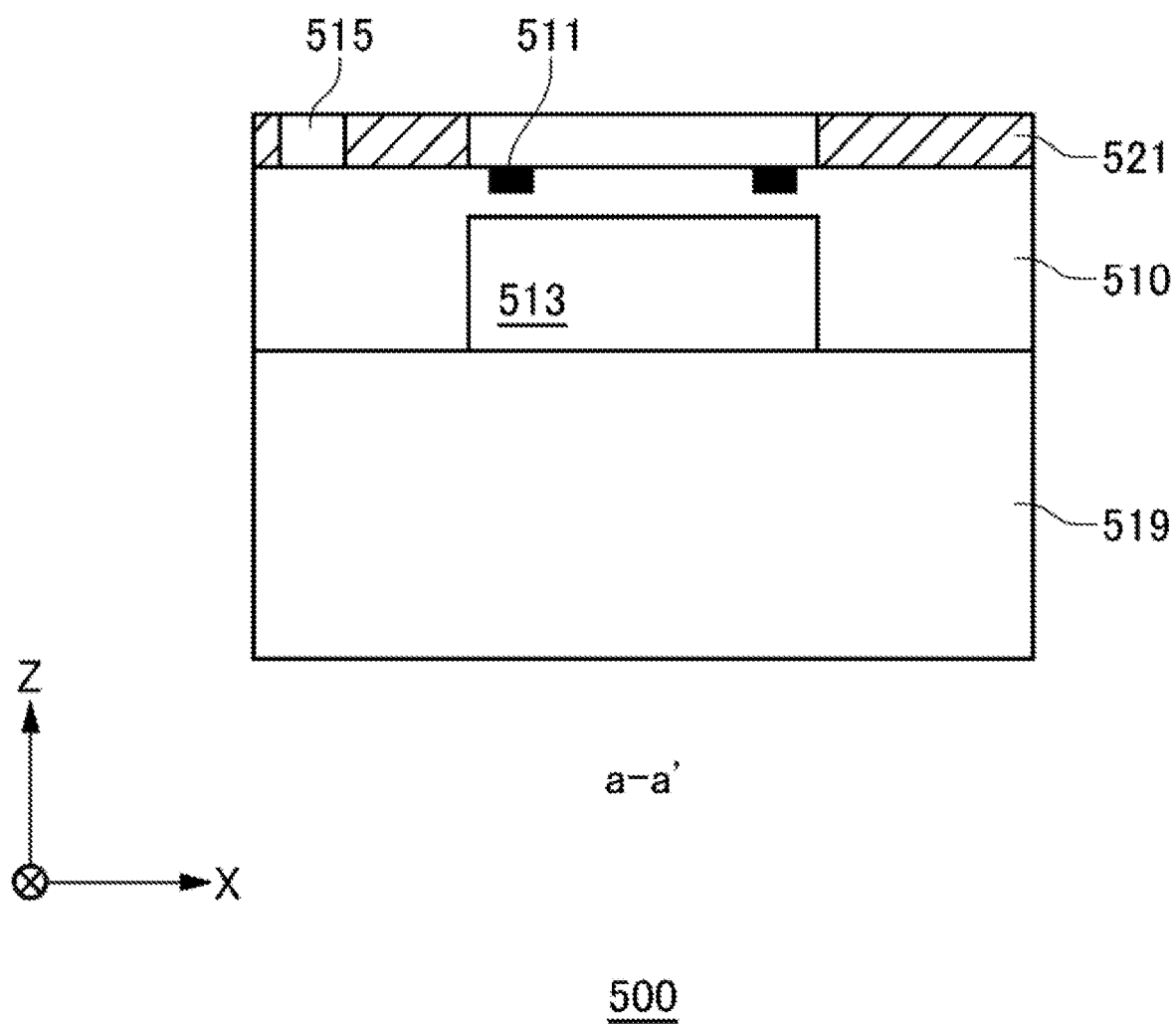
FIG. 4B is an a-a' cross-sectional view of the pressure sensor 500 according to the comparative example 1.

FIG. 4B is an a-a' cross-sectional view of the pressure sensor 500 according to the comparative example 1. In FIG. 4A, the a-a' cross-sectional view is an XZ-cross section passing through the resistance portion 511 and the slits 515. As shown in FIG. 4B, in the pressure sensor 500, the substrate 510 is laminated on the glass pedestal 519, as one example. On the back surface side of the substrate 510, the vacuum reference chamber 513 is provided and the diaphragm is formed.

In the present example, the protective film 521 is formed of the same material (e.g. aluminum) through the same process as that of the pad or the wiring. Thus, it is required that the slits 515 are provided and part of the protective film 521 is opened. This is because, without the slits 515 being provided, a path can not be ensured to guide hydrogen into the circuit in the substrate 510 in hydrogen annealing, and thus the effect of hydrogen annealing can not be enjoyed. However, providing the slits 515 in the pressure sensor 500 may worsen acid resistance of the region where the slits 515 is provided.

Contrary to this, in a pressure sensor 100 according to the examples, the first protective film 21 is not formed through the same process as the process dealing with aluminum such as the pad or the wiring. In the examples, the first protective film 21 is formed by extending the protective film above the pads into the space above the circuit portion, in forming the protective film including gold or platinum above the pads (the first pad 41 and the second pad 42) in a later step of the process of the pressure sensor 100. Hydrogen annealing is performed before this later step of the process, and thus, naturally, no configuration equivalent to the slits 515 in the comparative example 1 needs to be provided in the pressure sensor 100. Accordingly, more corrosion resistance (acid resistance) can be ensured, as compared with the configuration according to the comparative example 1.

Also, in the pressure sensor 100 according to the examples, no slit to deliver hydrogen to devices needs to be provided in the first protective film 21, and thus the surface of the circuit portion 30 can be entirely covered with the first protective film 21. Thereby, the pressure sensor 100 in the present example can reduce change in the characteristics due to initial characteristics of IC and in durability tests. Also, there is no risk of insufficient hydrogen annealing by covering the surface of the pressure sensor entirely with the metal film. Accordingly, reliability of the pressure sensor 100 improves.

Figure 5:
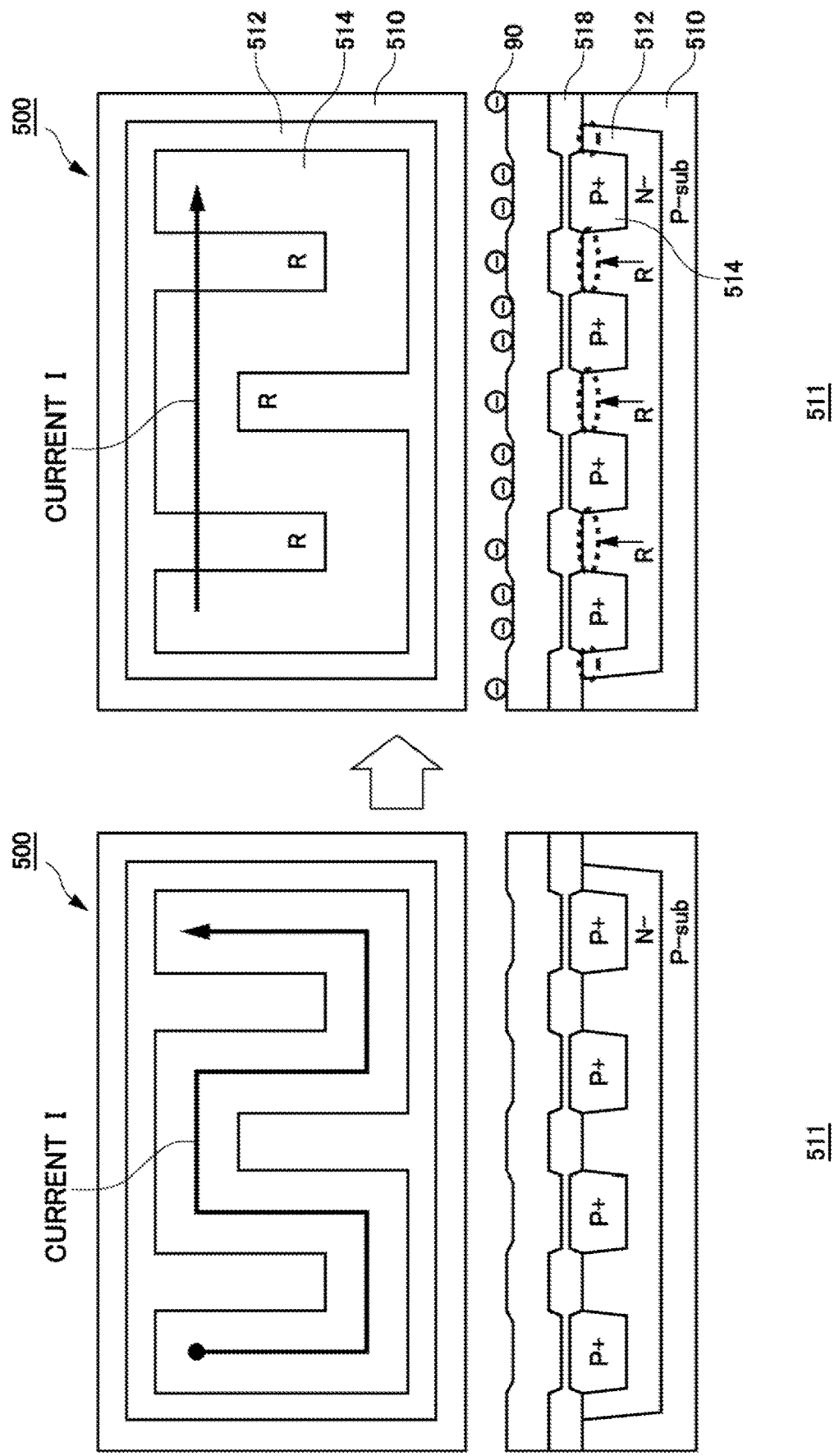
FIG. 5 shows an exemplary structure of a resistance portion 511 included in the pressure sensor 500 according to the comparative example 1.

FIG. 5 shows an exemplary structure of a resistance portion 511 included in the pressure sensor 500 according to the comparative example 1. The figure shows states before and after the negative charges 90 adhere on the surface of the pressure sensor 500. As described above, the protective film 521 is not provided above the insulating region or the resistance portion 511 of the sensor portion of the pressure sensor 500 in the comparative example 1.

The resistance portion 511 has a diffusion region 514 having a serpentine pattern. If the negative charges 90 are adhered on the surface of the pressure sensor 500, an inversion layer is formed on the well region 512 side of the element isolation film 518. The regions R in the figure indicate the inverted regions by being affected by the negative charges 90. If the inversion layers is formed, the diffusion region 514 functions as one single large diffusion region, resulting in turning the serpentine pattern of current I in the diffusion region 514 into approximately non-serpentine pattern, in some cases. In this case, current I in the resistance portion 511 does not flow in a serpentine pattern, and the obtained resistance value changes. Thereby, output voltage of the Wheatstone bridge configured of the resistance portions 511 changes significantly and the current consumption increases. Accordingly, the characteristics of the pressure sensor 500 are more affected.

Figure 6:
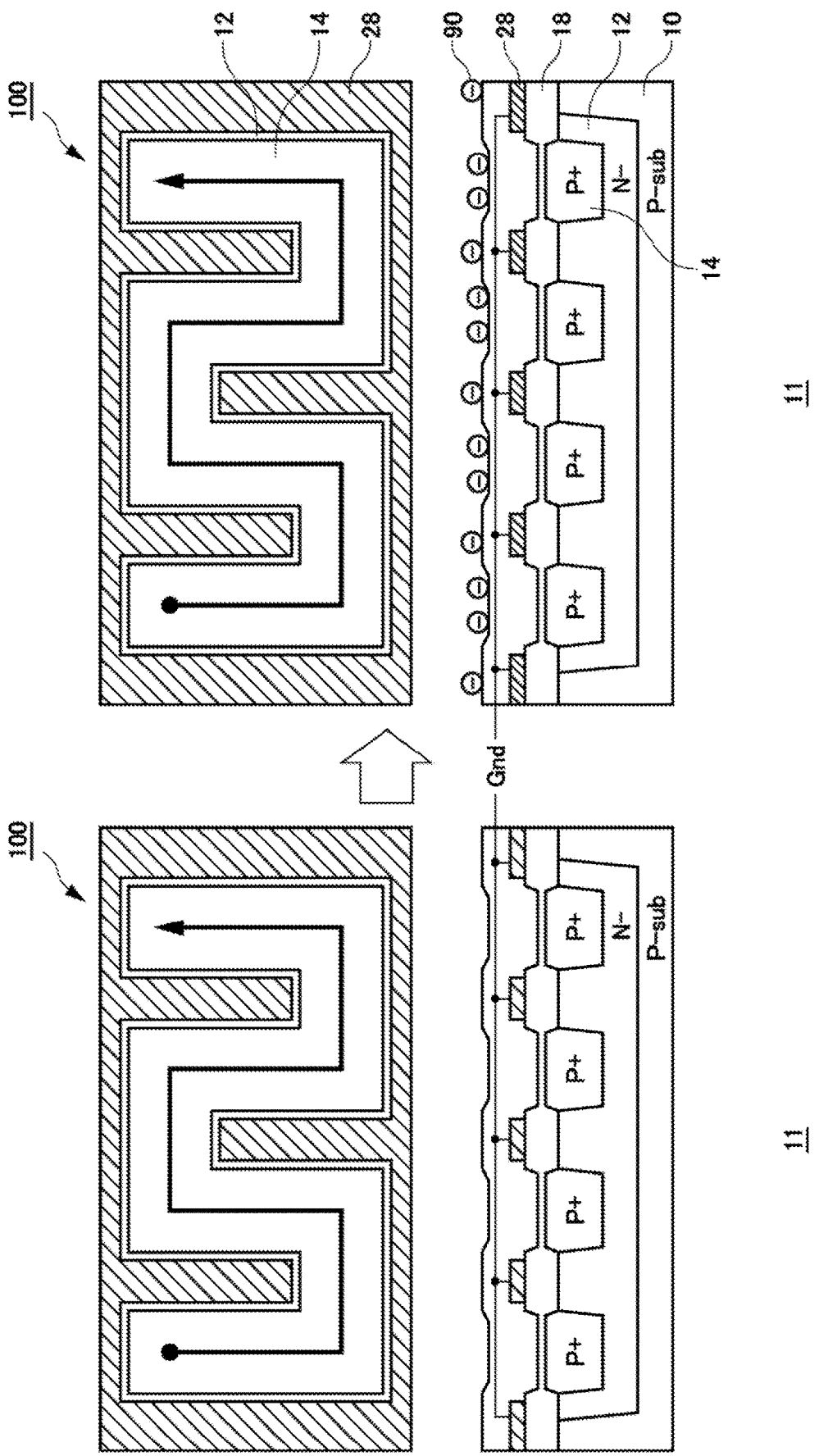
FIG. 6 shows an exemplary structure of a resistance portion 11 included in the pressure sensor 100 according to the example 3.

FIG. 6 shows an exemplary structure of a resistance portion 11 included in the pressure sensor 100 according to the example 3. The pressure sensor 100 in the present example includes the substrate 10, an element isolation film 18, and a second protective film 28. Also, the pressure sensor 100 includes the well region 12 and the diffusion region 14 that are provided on the substrate 10.

The well region 12 is of first conductivity type. The well region 12 is of N(−)-type, as one example. The well region 12 is provided on the upper surface of the substrate 10. The well region 12 is formed by dopant implantation into the upper surface of the substrate 10.

The diffusion region 14 is a region of second conductivity type that is provided in the well region 12. The diffusion region 14 is of P(+)-type, as one example. The diffusion region 14 is formed on the upper surface of the substrate 10. The diffusion region 14 has, in the upper surface of the substrate 10, a serpentine pattern configuring the semiconductor strain gauge (piezoresistive element). The diffusion region 14 in the present example is an impurity layer of P-type that is formed in the well region 12 of N-type. The diffusion region 14 is at least part of the diffusion resistance of the four resistance portions 11a to 11d configuring the Wheatstone bridge.

The element isolation film 18 is provided on the substrate 10 in the insulating region 16. The element isolation film 18 is a LOCOS (Local Oxidation of Silicon) film that is formed by oxidizing the substrate 10, as one example. The element isolation film 18 is, in the well region 12, provided next to the diffusion region 14. The element isolation film 18 is, in the diffusion region 14, provided such that current I flows along the serpentine pattern.

The second protective film 28 may be provided on the element isolation film 18. The second protective film 28 is connected to a reference potential. The second protective film 28 in the present example is connected to the ground potential.

The pressure sensor 100 in the present example has the second protective film 28 connected to the ground potential on the upper surface of the element isolation film 18. Thereby, if negative charges 90 are adhered on the upper surface of the resistance portion 11, an inversion layer can be prevented from being formed in the well region 12 below the element isolation film 18. This can prevent potential difference from being generated between the surface of the circuit portion 30 and the IC chip to prevent malfunction of the pressure sensor. Accordingly, the pressure sensor 100 in the present example prevents malfunction by the charged substance and has excellent charging resistance.

Note that, in FIG. 6, the effect of having the second protective film 28 in the example 3 on the upper surface of the element isolation film 18 has been described, but, similarly, in case where the first protective film 21 is provided above the resistance portion 11, malfunction due to the charged substances can be prevented.

Figure 7A:
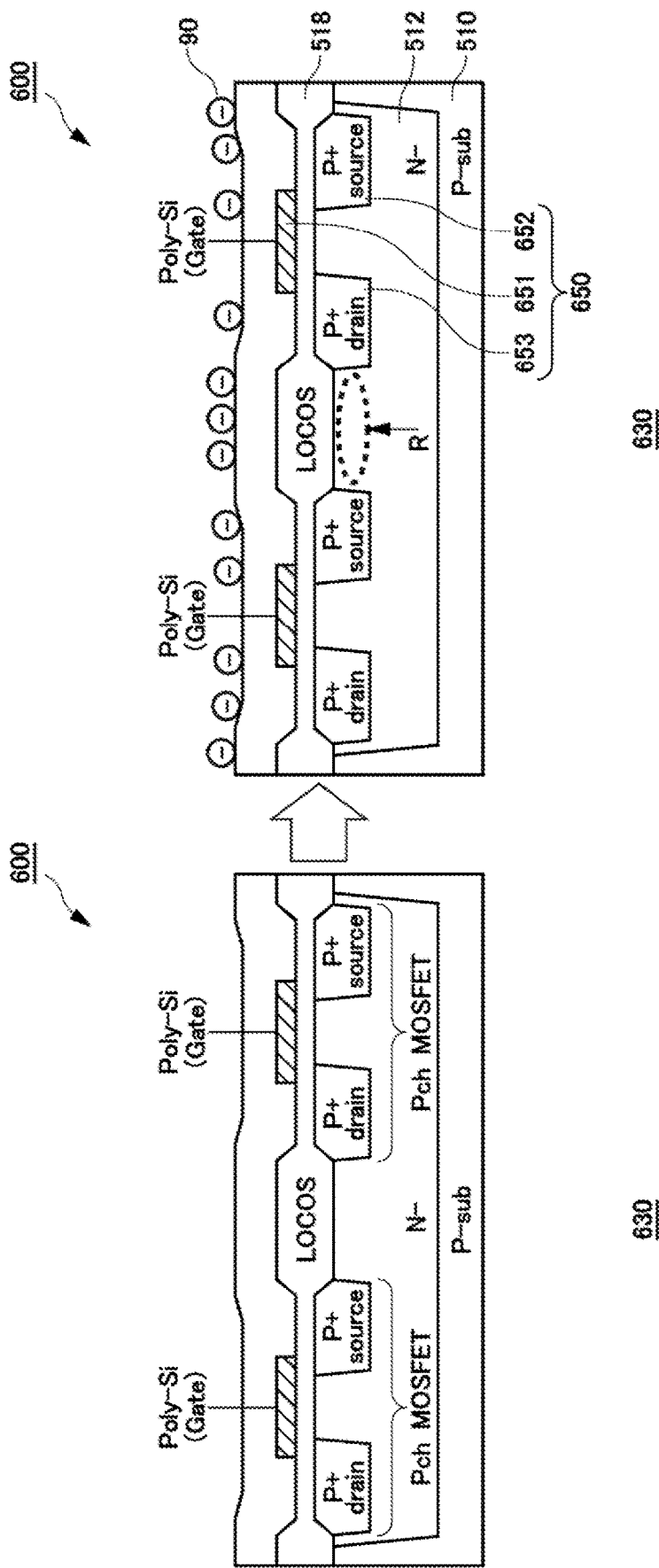
FIG. 7A shows an exemplary configuration of a circuit portion 630 that is provided in a pressure sensor 600 according to a comparative example 2.

FIG. 7A shows an exemplary configuration of a circuit portion 630 that is provided in a pressure sensor 600 according to the comparative example 2. The pressure sensor 600 in the comparative example 2 is different from the pressure sensor 500 in the comparative example 1 in that it does not have the protective film 521 either on the circuit portion 630. Note that the pressure sensor 600 in the comparative example 2, like the pressure sensor 500 in the comparative example 1, has the substrate 510, the well region 512, and the element isolation film 518.

The circuit portion 630 has the transistor portion 650. In the present example, an effect of the negative charges 90 adhered on the surface of the pressure sensor 600 on the transistor portion 650 is described. The negative charges 90 affect the transistor portion 650 being PMOS transistor. The transistor portion 650 in the present example includes a gate 651, a source 652, and a drain 653. The source 652 and the drain 653 have conductivity-type being P(+)-type.

The negative charges 90 are negatively charged substances. In case where the pressure sensor 600 measures pressure, negative charges 90 may adhere on the surface of the pressure sensor 600. In this case, the well region 512 on lower surface of the element isolation film 518 causes an inversion phenomenon, affected by the negative electrical field. If the inversion of the well region 512 is occurred, between the transistor portions 650 next to each other, the sources 652 and the drains 653 that are originally separated get connected via the inversion layer. Accordingly, leakage current may be generated between the source 652 and the drain 653 originally separated to cause significant change in the sensor signal, or malfunction. Note that, the region R in the figure indicates the inverted regions that are affected by the negative electrical field.

Figure 7B:
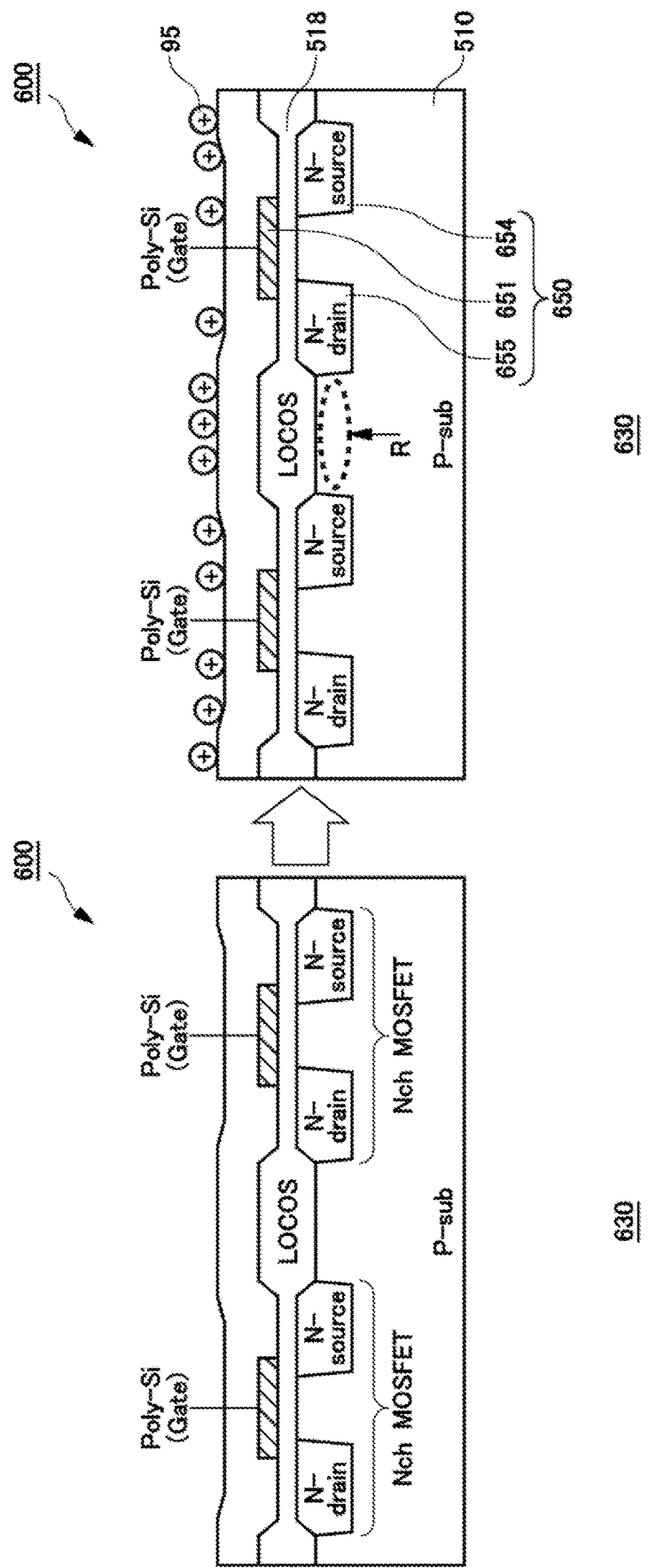
FIG. 7B shows an exemplary configuration of a circuit portion 630 that is provided in a pressure sensor 600 according to the comparative example 2.

FIG. 7B shows an exemplary configuration of a circuit portion 630 that is provided in a pressure sensor 600. The circuit portion 630 has the transistor portion 650. In the present example, an effect of the positive charges 95 adhered on the surface of the pressure sensor 600 on the transistor portion 650 is described. The positive charges 95 affect on the transistor portion 650 being NMOS transistor. The transistor portion 650 in the present example includes the gate 651, a source 654, and a drain 655. The source 654 and the drain 655 have conductivity-type being N(−)-type.

The positive charges 95 are positively charged substances. In case where the pressure sensor 600 measures pressure, positive charges 95 may adhere on the surface of the pressure sensor 600. If the positive charges 95 are adhered on the surface of the pressure sensor 600, the substrate 510 on the lower surface of the element isolation film 518 causes an inversion phenomenon, affected by the positive electrical field. If the inversion of the substrate 510 is occurred, between the transistor portions 650 next to each other, the sources 654 and the drains 655 that are originally separated get connected via the inversion layer. Accordingly, leakage current may be generated between the source 654 and the drain 655 originally separated to cause significant change in the sensor signal or malfunction. Note that, the region R in the figure indicates the inverted regions that are affected by the negative electrical field.

Figure 8A:
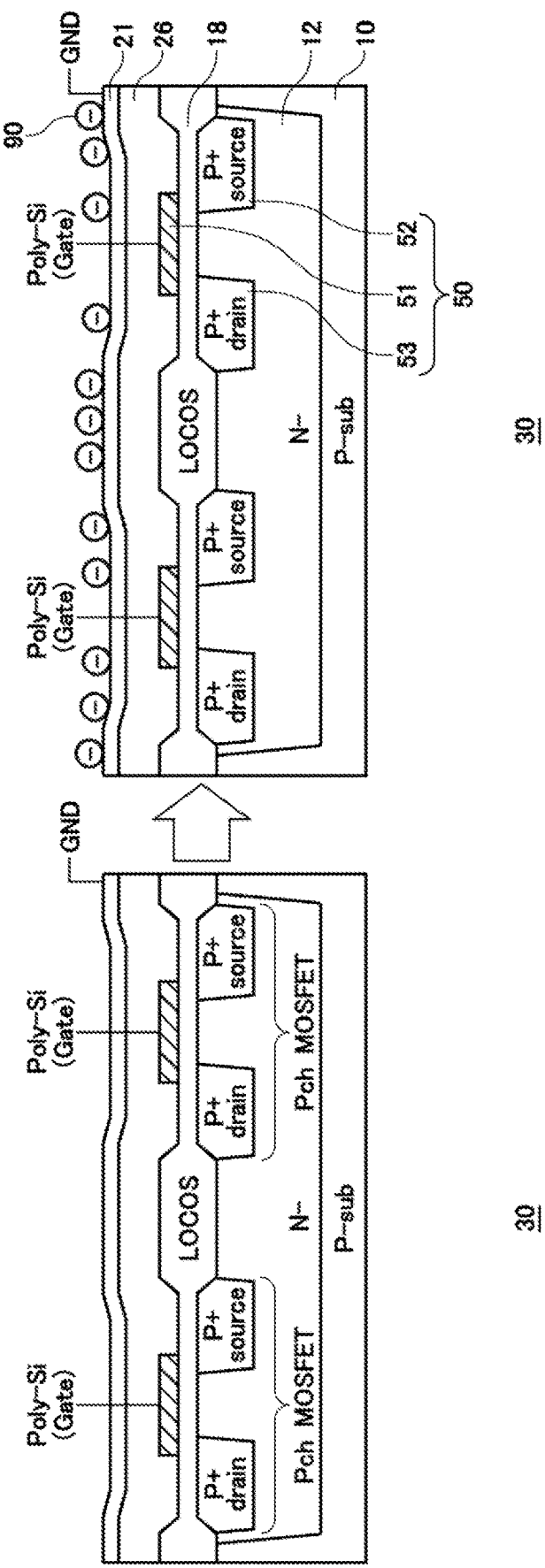
FIG. 8A shows an exemplary configuration of a circuit portion 30 that is provided in a pressure sensor 100 according to the examples.

FIG. 8A shows an exemplary configuration of a circuit portion 30 that is provided in a pressure sensor 100 according to the examples. The circuit portion 30 has a transistor portion 50 being NMOS. In the present example, an effect of the negative charges 90 adhered on the surface of the pressure sensor 100 on the transistor portion 50 is described.

The transistor portion 50 has a gate 51, a source 52, and a drain 53. The gate 51 may have the same material as that of the second protective film 28. For example, the gate 51 is formed of polysilicon. The source 52 and the drain 53 have conductivity-type being P(+)-type.

In the present example, the first protective film 21 is provided above the circuit portion 30. Thus, the transistor portion 50, if adhered by the negative charges 90, is not affected by the pressure sensor 100 in the present example, because the negative charges 90 are shielded by the first protective film 21. Accordingly, the pressure sensor 100 has excellent charging resistance against the negative charges 90.

Figure 8B:
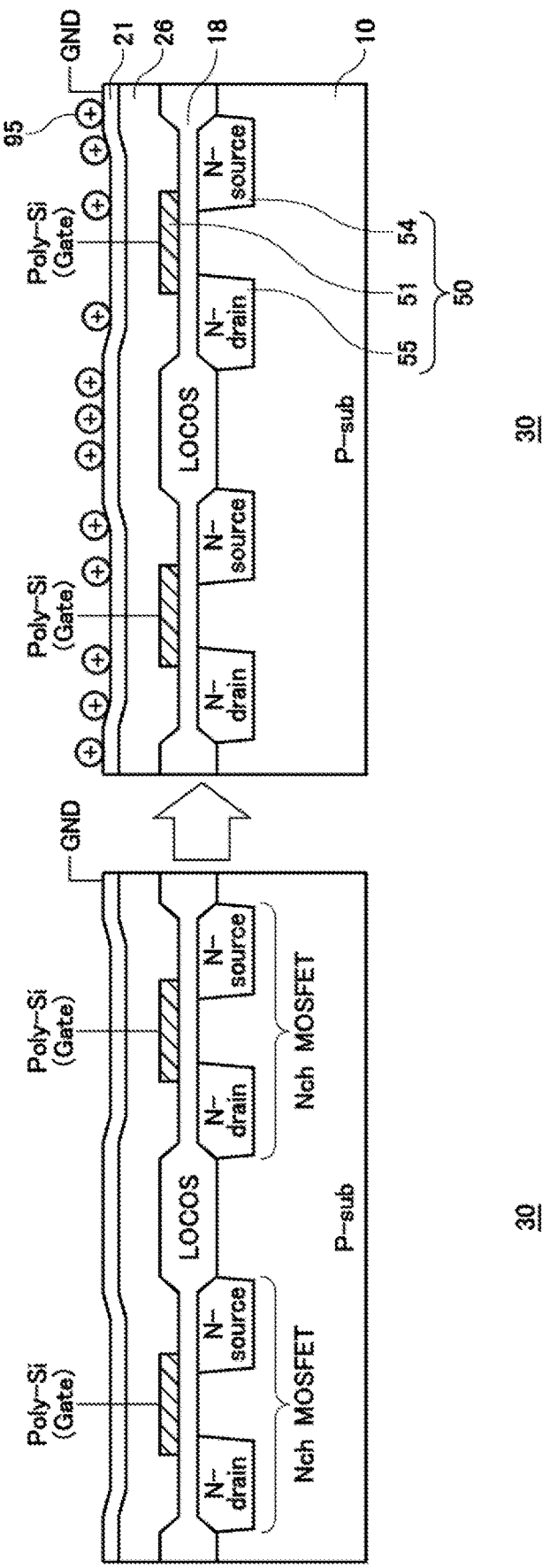
FIG. 8B shows an exemplary configuration of a circuit portion 30 that is provided in a pressure sensor 100 according to the examples.

FIG. 8B shows an exemplary configuration of a circuit portion 30 that is provided in a pressure sensor 100. The circuit portion 30 has a transistor portion 50 being PMOS.

In the present example, an effect of the positive charges 95 adhered on the surface of the pressure sensor 100 on the transistor portion 50 is described. The transistor portion 50 has a gate 51, a source 54, and a drain 55. The gate 51 is formed of polysilicon. The source 54 and the drain 55 have conductivity-type being N(−)-type.

In the present example, the first protective film 21 is provided above the circuit portion 30. Thus, the pressure sensor 100 in the present example, if adhered by the positive charges 95, is not affected by the transistor portion 50, because the positive charges 95 are shielded by the first protective film 21. Accordingly, the pressure sensor 100 has excellent charging resistance against the positive charges 95.

As described above, the pressure sensor 100 has excellent charging resistance.

Figure 9:
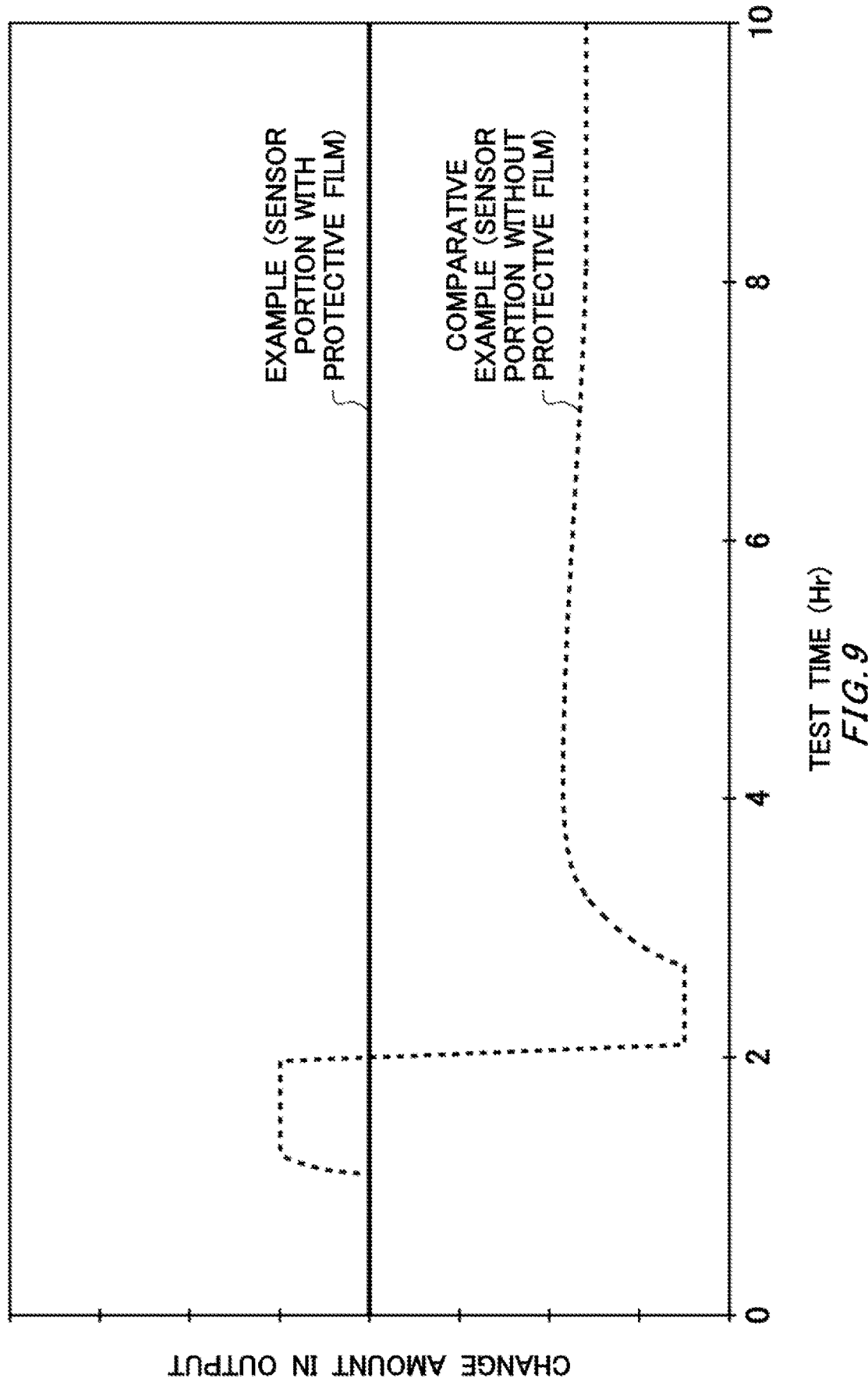
FIG. 9 shows dependency of the change amount in the output of the pressure sensor on the protective film.

FIG. 9 shows dependency of the change amount in the output of the pressure sensor on the protective film. The vertical axis represents change amount in the output of the pressure sensor, and the horizontal axis represents test time (Hr). The solid line represents change amount in the output of the pressure sensor 100 having a protective film in the sensor portion 60. Here, it represents change amount in the output of the pressure sensor 100 having the second protective film 28 in the example 3. Also, the dashed line represents change amount in the output of the pressure sensors 500, 600 having no protective film in the sensor portion in the comparative example. Here, it represents change amount in the output of the pressure sensor 600 having no protective film 521 in the comparative example 2.

As test time elapses, the charge amount of the electric charges that are charged on the surface of the pressure sensor increases. The solid line represents that the change amount in the output of the pressure sensor stays little as test time elapses, by the pressure sensor 100 having the second protective film 28. The second protective film 28 shields an electrical field generated by the negative charges 90 or the positive charges 95 that are adhered on the surface of the pressure sensor 100. Thus, although the negative charges 90 or the positive charges 95 are adhered more on the surface of the pressure sensor 100 as test time elapses, the pressure sensor 100 is affected little. Note that it is similar in case where the first protective film 21 is provided above the insulating region 16 and the resistance portion 11.

On the other hand, the dashed line represents that, due to the pressure sensor 600 having no protective film in the sensor portion, the pressure sensor 600 is affected by the negative charges 90 or the positive charges 95 adhered on the surface thereof. Thereby, the output of the pressure sensor 600 changes as test time elapses. The output of the pressure sensor 600 increases or decreases due to the effect of the negative charges 90 or the positive charges 95.

Figure 10:
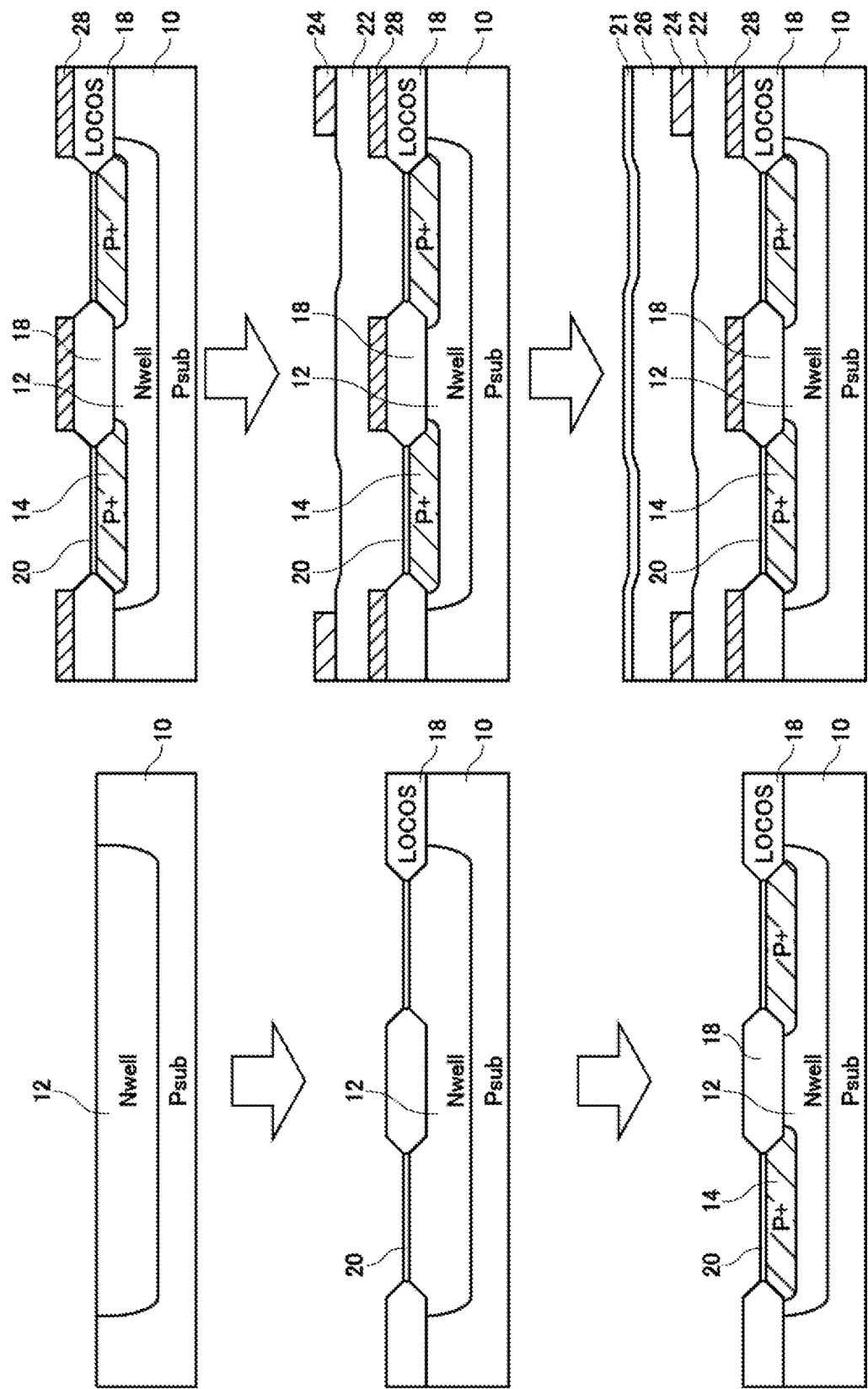
FIG. 10 shows an exemplary manufacturing method of the pressure sensor 100.

FIG. 10 shows an exemplary manufacturing method of the pressure sensor 100. The pressure sensor 100 may include, in the same chip, a transistor portion 50. In this case, at least part of the processes of the sensor portion 60 and the transistor portion 50 of the pressure sensor 100 may be performed in a common process.

In the manufacturing method of the pressure sensor 100, after the substrate 10 of P-type prepared, a well region 12 of N-type is formed on the upper surface of the substrate 10. The well region 12 is formed by ion implantation into the upper surface of the substrate 10. Then, the element isolation film 18 is formed on the upper surface of the substrate 10, and the insulating film 20 is formed on the well region 12. Forming the element isolation film 18 may be performed through the same process as that of the element isolation film 18 of the transistor portion 50. Forming the insulating film 20 may be performed through the same process as that of the gate insulating film of the transistor portion 50.

Next, in the well region 12, a diffusion region 14 that configures the semiconductor strain gauge (piezoresistive element) is formed. The diffusion region 14 may be formed by ion implantation. The diffusion region 14 is formed using a mask such as resist. Forming the diffusion region 14 may be performed in the same process as that of forming the source and the drain of the transistor portion 50. For example, the diffusion region 14 is a P+ region formed by implantation of P-type dopant.

Next, the second protective film 28 is formed on the upper surface of the element isolation film 18. The second protective film 28 in the present example is polysilicon that is formed through the same process as that of forming the gate 51 of the transistor portion 50. Note that the second protective film 28 may be not only formed on the upper surface of the element isolation film 18, but also formed on the whole surface so as to cover the insulating film 20 as well.

Next, an interlayer dielectric film 22 is formed above the insulating film 20 and the second protective film 28. A wiring 24 is formed above the interlayer dielectric film 22. The interlayer dielectric film 22 may have openings formed. In case of forming the opening in the interlayer dielectric film 22, the wiring 24 is formed in the opening in the interlayer dielectric film 22. Furthermore, a passivation film 26 is formed on the upper surface of the interlayer dielectric film 22 and the wiring 24. The passivation film 26 in the present example is a surface protective film such as a nitride film. Furthermore, in the passivation film 26, openings for pads may be formed.

On the upper surface of the passivation film 26, the first protective film 21 is formed. The first protective film 21 may have a plurality of types of metal layers that are laminated by sputtering or the like. For example, the first protective film 21 is made of Cr/Pt/Au or Ti/Pt/Au. Note that, on the upper surface of the first protective film 21, a gelatinous protective material may be provided to transfer pressure. For example, as the protective material, silicone gel may be formed.

As described above, by performing at least part of the process of the sensor portion of the pressure sensor 100, and the process of the transistor portion 50 in a common process, the manufacturing process is simplified. By performing the CMOS manufacturing process of the transistor portion 50 in a common process, the pressure sensor 100 in the present example achieves a monolithic chip obtained by integrating the sensor portion 60 and the circuit portion 30 into one-chip without big design modification. The pressure sensor 100 in the present example has low manufacturing cost and high reliability.

Figure 11:
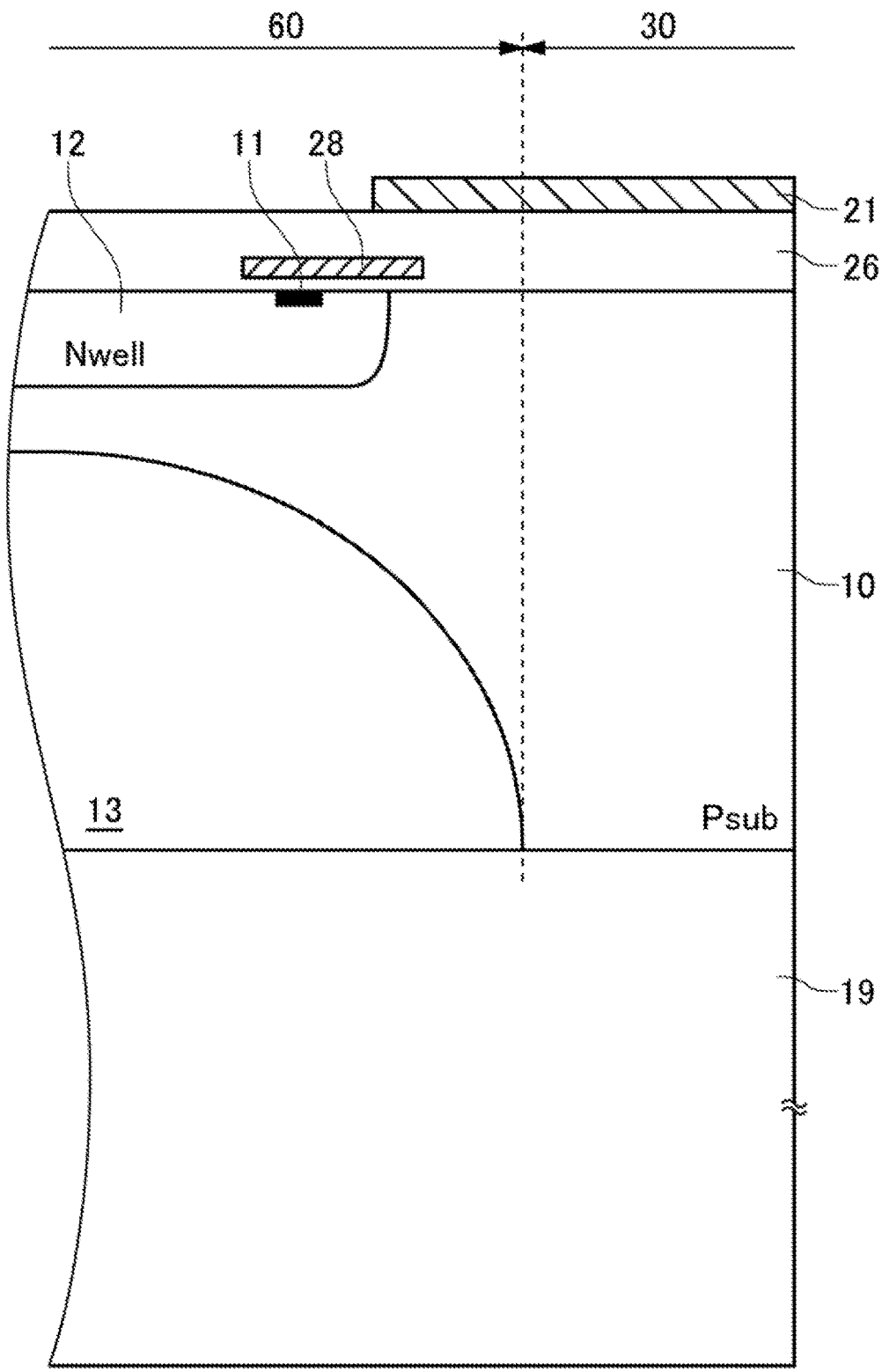
FIG. 11 is an exemplary cross-sectional view of the pressure sensor 100.

FIG. 11 is an exemplary cross-sectional view of the pressure sensor 100. The figure shows a cross-sectional view near the end portion of the sensor portion 60. The sensor portion 60 has a diaphragm formed by etching the back surface of the substrate 10. The substrate 10 is provided on the glass pedestal 19. Below the diaphragm, the vacuum reference chamber 13 is provided.

The arrangement of the first protective film 21 and the second protective film 28 may be appropriately changed, considering the effect on the characteristics of the pressure sensor 100 and the reliability of the pressure sensor 100.

In the circuit portion 30, the first protective film 21 is provided on the passivation film 26. Extending the first protective film 21 from the circuit portion 30 into the sensor portion 60 improves corrosion resistance in a larger region. However, in case where the first protective film 21 is excessively extended into sensor portion 60, film stress of the sensor portion 60 may change to worsen the characteristics of the pressure sensor 100. Thus, a region where the first protective film 21 is arranged is decided, considering, in addition to an effect on the corrosion resistance and the charging resistance, an effect on the characteristics of the pressure sensor 100.

The second protective film 28 is provided above the element isolation film 18 near at least the resistance portion 11. Thereby, the second protective film 28 prevents an inversion layer from being formed in the resistance portion 11.

Also, the first protective film 21 extends from the circuit portion 30 into the sensor portion 60. Thereby, above the substrate 10, the end portion of the first protective film 21 is provided, overlapping the second protective film 28. The first protective film 21 and the second protective film 28 in the present example are provided overlapping each other above the end portion of the well region 12. Note that the second protective film 28 may cover the resistance portion 11 entirely. However, even in this case, the second protective film 28 does not cover at least part of the sensor portion 60.

Figure 12:
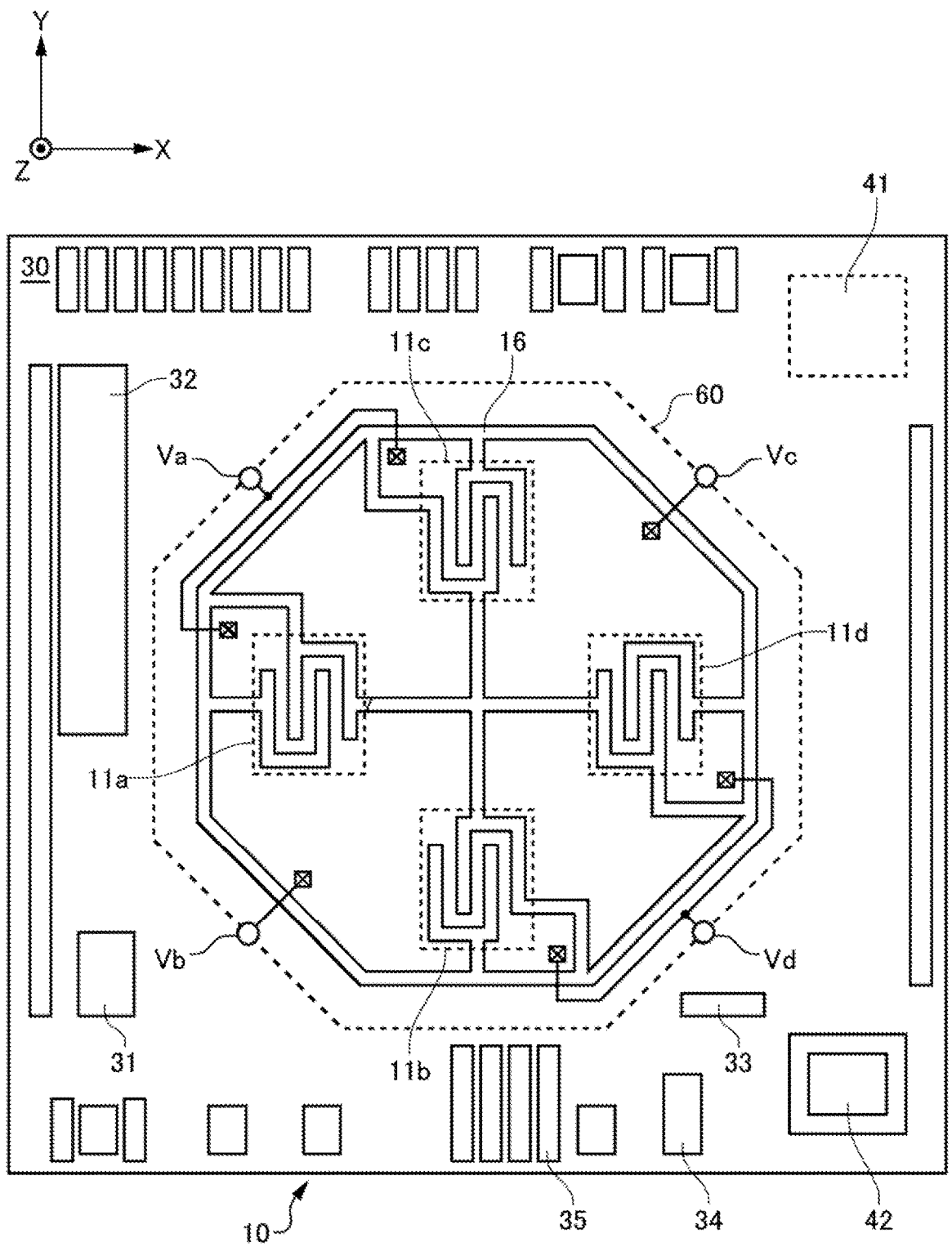
FIG. 12 shows an exemplary more specific configuration of the pressure sensor 100.

FIG. 12 shows an exemplary more specific configuration of the pressure sensor 100. The pressure sensor 100 in the present example includes, in the circuit portion 30, a signal processing circuit 31, a characteristics compensation circuit 32, an overvoltage protection circuit 34, and EMC protection elements 35.

The signal processing circuit 31 performs processing on a signal output from the sensor portion 60. In one example, the signal processing circuit 31 amplifies potential difference detected by the resistance portion 11 and outputs, as the resultant amplified electrical signal, the pressure. Thereby, the signal processing circuit 31 calculates the pressure generated in the pressure sensor 100.

The characteristics compensation circuit 32 is a circuit to compensate the characteristics of the sensor portion 60. In one example, the characteristics compensation circuit 32 corrects output characteristics of the sensor portion 60 based on environmental temperature, etc. Thereby, the characteristics compensation circuit 32 compensates characteristics of the pressure sensor 100.

The failure diagnosis circuit 33 diagnoses whether the sensor portion 60 fails or not. In one example, in case of failure of the sensor portion 60, the failure diagnosis circuit 33 stops operation of the pressure sensor 100.

The overvoltage protection circuit 34 monitors voltage input to the sensor portion 60. Thereby, the overvoltage protection circuit 34 protects the sensor portion 60 from over voltage.

The EMC protection element 35 is an element to protect the sensor portion 60 from electromagnetic wave. In one example, the EMC protection element 35 protects the circuit from interference by the electromagnetic wave generated by circuits of the circuit portion 30. Also, the EMC protection element 35 can protect the pressure sensor 100 from electromagnetic noise from outside of the pressure sensor 100.

As described above, the pressure sensor 100 in the present example can provide excellent corrosion resistance and charging resistance. Accordingly, the pressure sensor 100 hardly malfunctions even under a severe environment, and can detect pressure with high accuracy. Accordingly, the pressure sensor 100 may be used for various types of apparatuses for automotive, medical use, industrial use, or the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A pressure sensor comprising:
    a sensor portion that is provided in a diaphragm in a substrate;
    a circuit portion that is provided on the substrate and electrically connected to the sensor portion;
    a pad of conductivity that is provided above the substrate; and
    a first protective film that is provided on the pad, wherein
    the first protective film is also provided above the circuit portion,
    the sensor portion has:
        a well region of first conductivity type,
        a diffusion region of second conductivity type that is provided in the well region, and
        an insulating region that is provided, in the well region, next to the diffusion region, and
    the pressure sensor further comprises a second protective film that is provided above the insulating region and has material different from material of the first protective film.

2. The pressure sensor according to claim 1, wherein the first protective film covers the circuit portion entirely.

3. The pressure sensor according to claim 1, wherein the first protective film does not cover at least part of the sensor portion.

4. The pressure sensor according to claim 1, wherein the first protective film covers part of the sensor portion.

5. The pressure sensor according to claim 1, wherein the first protective film includes at least one of gold and platinum.

6. The pressure sensor according to claim 1, further comprising
    a passivation film that is provided above the sensor portion, wherein
    the first protective film is provided on the passivation film.

7. The pressure sensor according to claim 6, wherein the second protective film is provided below the passivation film.

8. The pressure sensor according to claim 1, wherein
    the insulating region has an element isolation film that is provided on the substrate, and
    the second protective film is provided on the element isolation film.

9. The pressure sensor according to claim 1, wherein
    the circuit portion has a MOS transistor, and
    the second protective film has same material as material of gate polysilicon of the MOS transistor.

10. The pressure sensor according to claim 1, wherein an end portion of the first protective film is provided overlapping the second protective film above the substrate.

11. The pressure sensor according to claim 1, wherein the first protective film and the second protective film are provided overlapping each other above an end portion of the well region.

12. The pressure sensor according to claim 1, wherein the second protective film includes polysilicon.

* * * * *